United States Patent [19]

Rodi

[11] Patent Number: 4,464,615

[45] Date of Patent: Aug. 7, 1984

[54] DEVICE FOR CONTROLLING A PLURALITY OF SERVOMOTORS ON PRINTING MACHINES

[75] Inventor: Anton Rodi, Leimen, Fed. Rep. of Germany

[73] Assignee: Heidelberger Druckmaschinen AG, Heidelberg, Fed. Rep. of Germany

[21] Appl. No.: 448,225

[22] Filed: Dec. 9, 1982

[30] Foreign Application Priority Data

Dec. 10, 1981 [DE] Fed. Rep. of Germany ....... 3148947

[51] Int. Cl.³ ............................................ G05B 11/32

[52] U.S. Cl. .................................... 318/625; 318/590; 101/DIG. 24; 101/365

[58] Field of Search ............ 101/DIG. 24, 365, 450.1; 318/625, 71, 85, 590, 317

[56] References Cited

U.S. PATENT DOCUMENTS 3,757,179 9/1973 Pederson .......................... 318/71 X
3,774,536 11/1973 Raymond et al. ............. 101/365 X
4,193,345 3/1980 Schoneberger ..................... 101/365
4,390,958 6/1983 Mamberger .................... 101/365 X

FOREIGN PATENT DOCUMENTS 61596 10/1982 European Pat. Off. .... 101/DIG. 24

*Primary Examiner*—B. Dobeck
*Attorney, Agent, or Firm*—Herbert L. Lerner; Laurence A. Greenberg

[57] ABSTRACT

Device for controlling a plurality of servomotors on a printing machine having a plurality of printing units with the servomotors respectively assigned to individual zones of the printing units, a control unit connected to the servomotors for switching the servomotors on and off, and a power supply for supplying operating current to the servomotors, including a current-measuring module located in a connection between the power supply and the control unit for measuring a control current corresponding to the operating current supplied to the servomotors, the current-measuring module being controllable by a microprocessor for limiting the number of operating servomotors.

6 Claims, 1 Drawing Figure

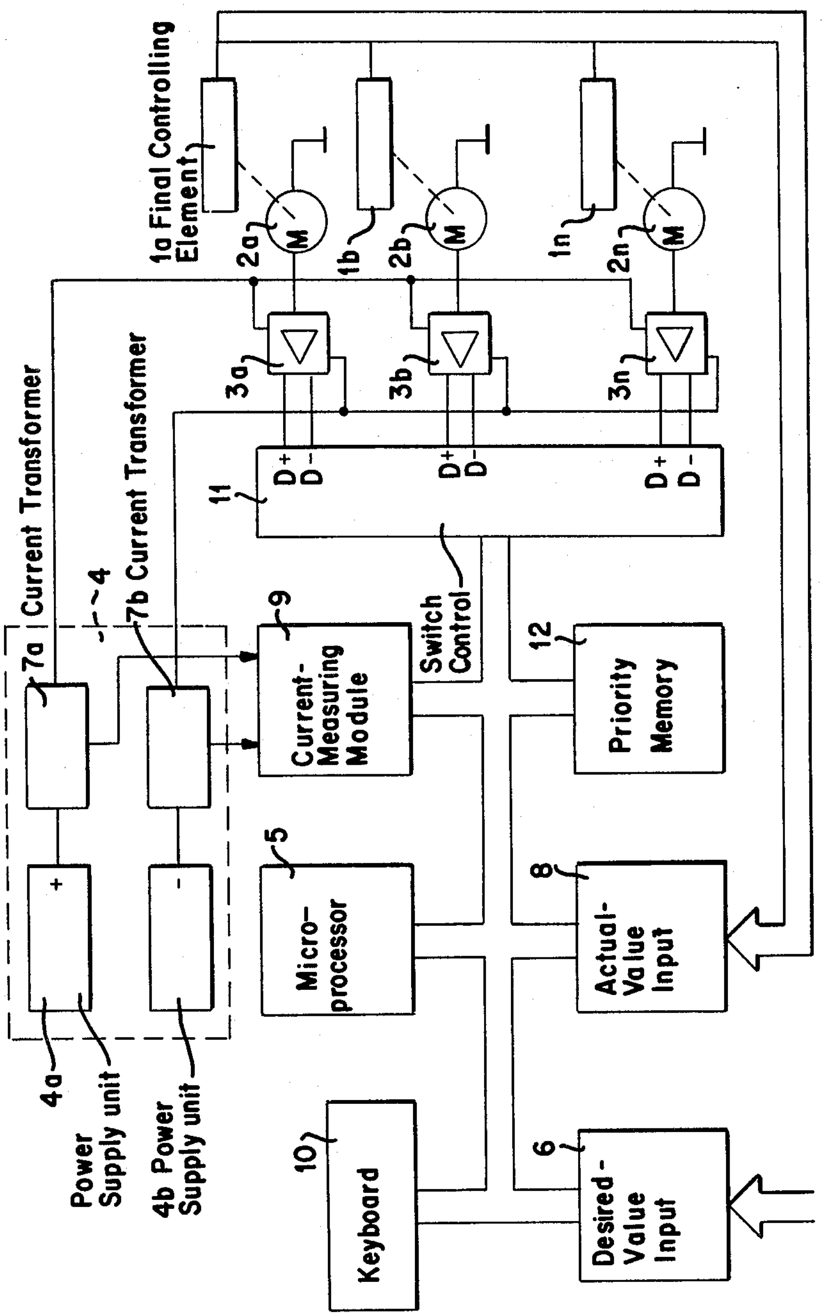
1a Final Controlling Element
1b
1n
2a
2b
2n
M
3a
3b
3n
D+
D-
11
Current Transformer
7a
~4
7b Current Transformer
9
Current-Measuring Module
Switch Control
12
Priority Memory
5
Micro-processor
8
Actual-Value Input
10
Keyboard
6
Desired-Value Input
4a
Power Supply unit
4b Power Supply unit

DEVICE FOR CONTROLLING A PLURALITY OF SERVOMOTORS ON PRINTING MACHINES

The invention relates to a device for controlling a plurality of servomotors on printing machines, particularly, for adjusting thickness profile of a printing machine i.e. ink or dampening solution, on offset printing machines having a plurality of printing units, with the servomotors assigned to individual zones of each printing unit, a control unit connected to the servomotors for switching the servomotors on and off, and a power supply to feed the servomotors when in operation.

In modern offset printing machines, the ink knife is replaced by a number of adjacent final controlling elements which determine the ink thickness in a given zone. Through various settings of these final controlling elements, it is possible to set the optimum ink thickness profile for the respective impression just as with an ink knife. Adjustment of the final controlling elements is effected by providing these final controlling elements with a device for feeding back the actual position thereof to the control unit which, in turn, connects the servomotor to the power supply caused it thereby to operate until the actual position is the same as the desired position.

When setting up the printing machine it is usually necessary to switch on a plurality of the existing servomotors simultaneously. Since the adjustment should take place in a relatively short time, the servomotors have a suitably high power rating and accordingly also a high current consumption. Moreover, this current consumption is not constant, but depends, for example, on the consistency of the ink. Furthermore, the power required when the servomotor first starts up is greater than after it is in operation. There may also be differences from servomotor to servomotor due to differences in the freedom of movement of the necessary transmissions which may, for example, be attributable to production tolerances.

In heretofore known printing machines, the power supply is constructed so that it can simultaneously drive all of the servomotors provided on a printing unit. Since a worst-case power demand has to be allowed for, such a power supply is dimensioned relatively generously. If a printing machine has a plurality of printing units, as is necessary for multicolor prints, it is also necessary to have a corresponding number of power supplies. The expense necessitated thereby is relatively high.

Therefore, it is an object of the invention to provide a device for controlling a plurality of servomotors on a printing machine which, while maintaining short set-up times, affords a considerable reduction in the technical expense or outlay required for the power supplies.

With the foregoing and other objects in view, there if provided, in accordance with the invention, a device for controlling a plurality of servomotors on a printing machine having a plurality of printing units with the servomotors respectively assigned to individual zones of the printing units, a control unit connected to the servomotors for switching the servomotors on and off, and a power supply for supplying operating current to the servomotors, including a current-measuring module located in a connection between the power supply and the control unit for measuring a control current corresponding to the operating current supplied to the servomotors, the current-measuring module being controllable by a microprocessor for limiting the number of operating servomotors.

The invention makes use of the fact that it is only very seldom necessary for all servomotors to be switched on simultaneously and, furthermore, the different servomotors are turned on for different lengths of time depending on how far away the final controlling element is from the desired position when it is switched on. The control unit ensures that the power supply will always operate at full capacity by immediately switching on a new motor as soon as a previously connected motor is switched off after the respective final controlling element has reached the desired position. Therefore, unnecessary waiting times or delay periods are prevented, and all final controlling elements of the printing press are brought into the desired position in a very short time. In this connection, it is quite possible for motors which are assigned to different printing units to be in operation simultaneously.

In the most simple case, the control unit can maintain a constant number of motors which are switched on as long as other motors are waiting to be switched because the respective final controlling elements are not in the desired position. A control which merely keeps the number of switched-on motors constant does not take account of the hereinaforementioned different power requirement of the various motors, with the result that, with regard to the worst case, optimum use cannot be made of the power supply.

In accordance with another feature of the invention, the power supply is electrically convertible to the servomotors via the control unit as a function of the intensity of the operating current supplied to all of the operating servomotors.

In accordance with a further feature of the invention, the power supply has means for enabling the servomotors to be switched on until the total operating current supplied to the servomotors exceeds a limit value lying below the powe capacity of the power supply. This limit value must be set so that the capacity of the power supply is not exceeded even if a new motor is switched on when the total current consumption is already at a level lying just below the fixed limit value. The instantaneous excess current which occurs when the motor starts up can be neglected as long as the continuous load remains within the capacity of the power supply.

A particular advantage of the control unit according to the invention lies in the fact that the servomotors can be connected to the power supply independently of the fact that they may belong to a specific printing unit, with the result that if corrections are necessary during printing it is readily possible for simultaneous adjustments to be performed on all printing units as long as only a few servomotors have to be switched on for each printing unit. In the event that the necessary adjustments assume such proportions that they could not all be carried out simultaneously, it is advantageous, in accordance with the invention, to give priority to individual motors or groups of motors so that the control unit causes the motors to be switched on according to the priority ranking thereof.

Thus, in accordance with additional alternate features of the invention, the device includes a priority memory having stored therein assigned switching priorities for individual and/or groups of servomotors, the priority memory being controllable by the microprocessor for activating the control unit in accordance with the priority ranking of the servomotors.

In accordance with a concomitant feature of the invention, the printing machine is an offset printing machine and the servomotors are comprised of means for adjusting a printing-medium thickness profile in a printing-medium unit of the offset printing machine. Other features which are considered as characteristic for the invention are set forth in the appended claims.

Although the invention is illustrated and described herein as embodied in a device for controlling a plurality of servomotors on printing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a circuit diagram in block form of the control device according to the invention.

Referring now to the FIGURE of the drawing, there is shown therein schematically the device according to the invention with n final controlling elements 1a, 1b, . . . , 1n of a printing machine which permit adjustment or setting of the ink profiles of the individual printing units of the printing press. Each final controlling element is assigned to a zone of the ink thickness profile. The final controlling elements 1a, 1b, . . . , 1n are respectively driven by servomotors 2a, 2b, . . . , 2n which, in turn, are connectible via a controllable switch 3a, 3b, . . . , 3n to a common power supply 4 which, in the illustrated embodiment, includes two independent units 4a and 4b, namely one for forward travel and one for backward travel of the servomotors 2a, 2b, . . . , 2n, of which each unit can be considered to be a power supply controlled in accordance with the invention. The connection of the motors to the power supply 4 is controlled with the aid of a current-measuring module 9 by a microprocessor 5 which is supplied by the final controlling elements 1a, 1b, . . . , *1n*, through the intermediary of an actual-valve input unit 8, with signals regarding the actual positions of the individual final controlling elements. Furthermore, the microprocessor is supplied with the characteristic values for the desired positions of the final controlling elements 1a, 1b, . . . , 1n by a suitable desired-value input unit 6, for example an output desk operated by the printer and also having a keyboard 10. A difference between the actual position reported by a final controlling element and the desired position required by the desired-value input unit 6 shows the microprocessor 5 that the corresponding servomotor must be switched on until the actual position coincides or is identical with the desired position. It goes without saying that the switches 3a, 3b, . . . , 3n permit forward or backward travel as required, due to connection to the unit 4a or 4b of the power supply for the respective motor, depending upon whether the actual position is below or exceeds the desired position.

According to the invention, the microprocessor does not connect to the power supply 4 all of the servomotors 2a, 2b, . . . , 2n, the final controlling elements of which are out of the desired position, but rather, connects only so many of the motors as will not cause the maximum capacity of the power supply 4 to be exceeded. For this purpose, wired into each of the cables leading from the units 4a and 4b of the power supply 4 to the switches 3a, 3b, . . . , 3n is a respective current transformer *7a, 7b* which supplies a current-measuring module 9 with a signal characteristic of the total current intensity. By means of a switch control 11, the microprocessor 5 controls the switching-on of the motors in a sequence laid down in a priority memory 12 until the output signal of the current-measuring module 9 indicates that a set limit value has been exceeded. If this limit value is selected so that it is lower than the capacity of the power supply 4a/4b by the maximum current consumption of one motor, assurance is thus provided that this capacity will never be exceeded. Conversely, assurance is provided that this power capacity will always be fully utilized irrespective of the instantaneous power demand of each individual motor. Of particular advantage is the fact that final controlling elements assigned to different printing units can be moved or adjusted simultaneously.

It would in principle be possible for the microprocessor to scan the final controlling elements cyclically and for it to switch on the motors in the thus resulting sequential order, one after the other until there is no difference any longer between desired position and actual position. In this connection, all of the servomotors would be treated equally. The use of the priority memory 12 makes it possible, however, to bring the addresses of the final controlling elements into such order that it is always the position of those final controlling elements most in need of adjustment that are corrected first. For example, the final controlling elements assigned to a printing unit with a specific color of ink may have priority over other final controlling elements, for example, those assigned to the blue ink. It would also be conceivable, however, for priorities to be set according to the amount of adjustment required so that those motors having final controlling elements which deviate farthest from the desired position are switched on first. In this way, serious maladjustments are corrected before fine corrections are made to other settings. Such orders of priority are readily realizable by means of the microprocessor 5 and the priority memory 12 with the use of known programs.

It goes without saying that the invention is not restricted to the embodiment illustrated in the drawing; as mentioned herein-before, variations are possible without going beyond the scope of the invention. Thus, for example, it is possible to make the switching-on of the motors not dependent upon the total current consumption, but instead to monitor the total number of the moors switched on and to keep the number of switched-on motors constant as long as there are other motors waiting to be switched on. It would also be possible, for example, to compare the actual and desired positions directly at the final controlling element and thereby supply the microprocessor with error signals from the final controlling element itself.

Furthermore, it would be possible also to monitor the current consumption of the individual motors and to report thereon back to the microprocessor which then calculates the total current consumption therefrom. Moreover, it is also not compulsory to use a microprocessor, but instead, use may be made of a hard-wired control device. Accordingly, there are many possible ways of realizing a device according to the invention.

It should also be pointed out that the invention is not restricted to the setting of the ink thickness profile in offset printing machines, but rather, according to the invention, that the ink or also the dampening-medium thickness profiles on any kind of printing machine can be set or adjusted in accordance with the invention. Besides, it is possible in principle, to include other servomotors of such printing machines in such a device and, if necessary or desirable, to provide them with special priorities.

I claim:

1. Device for controlling a plurality of servomotors on a printing machine having a plurality of printing units with the servomotors respectively assigned to individual zones of the printing units, a control unit connected to the servomotors for switching the servomotors on and off, and a power supply for supplying operating current to the servomotors, comprising a current-measuring module located in a connection between the power supply and the control unit for measuring a control current corresponding to the operating current supplied to the servomotors, said current-measuring module being controllable by a microprocessor for limiting the number of operating servomotors.

2. Device according to claim 1 wherein the power supply is electrically connectible to the servomotors via the control unit as a function of the intensity of the operating current supplied to all of the operating servomotors.

3. Device according to claim 2 wherein the power supply has means for enabling the servomotors to be switched on until the total operating current supplied to the servomotors exceeds a limit value lying below the power capacity of the power supply.

4. Device according to claim 1 including a priority memory having stored therein assigned switching priorities for the individual servomotors, said priority memory being controllable by the microprocessor for activating the control unit in accordance with the priority ranking of the servomotors.

5. Device according to claim 1 including a priority memory having stored therein assigned switching priorities for groups of the servomotors, said priority memory being controllable by the microprocessor for activating the control unit in accordance with the priority ranking of the groups of servomotors.

6. Device according to claim 1 wherein the printing machine is an offset printing machine, and the servomotors are comprised of means for adjusting a printing-medium thickness profile in a printing-medium unit of the offset printing machine.

* * * * *